United States Patent [19]
Kato et al.

[11] Patent Number: 6,122,295
[45] Date of Patent: Sep. 19, 2000

[54] MULTI-CHANNEL COMMUNICATION

[75] Inventors: Ichiro Kato, Kawasaki; Toshihiko Myojo; Rie Suzuki, both of Yokohama, all of Japan

[73] Assignee: Canon Kabushiki Kaisha, Tokyo, Japan

[21] Appl. No.: 08/654,882

[22] Filed: May 29, 1996

[30] Foreign Application Priority Data

Jun. 8, 1995 [JP] Japan .................................... 7-167030
Dec. 22, 1995 [JP] Japan .................................... 7-335046

[51] Int. Cl.$^7$ .................................................. H04J 13/02
[52] U.S. Cl. ............................................ 370/479; 455/522
[58] Field of Search .................................... 370/329, 335, 370/342, 252, 320, 318, 441, 479, 522; 455/522, 103, 59, 102

[56] References Cited

U.S. PATENT DOCUMENTS

| | | |
|---|---|---|
| 4,958,359 | 9/1990 | Kato . |
| 5,142,525 | 8/1992 | Nakatsuma . |
| 5,291,515 | 3/1994 | Uchida et al. .......................... 375/200 |
| 5,426,666 | 6/1995 | Kato . |
| 5,448,374 | 9/1995 | Yakoyama et al. . |
| 5,539,728 | 7/1996 | Gaiani et al. ........................... 370/342 |
| 5,550,811 | 8/1996 | Kaku et al. . |

*Primary Examiner*—Huy D. Vu
*Attorney, Agent, or Firm*—Fitzpatrick, Cella, Harper & Scinto

[57] ABSTRACT

A multiple communicating apparatus has a multiple communicating unit for communicating data through a plurality of channels and a control circuit for controlling the multiple communicating unit in a manner such that the transmission electric power of each channel is inversely proportional to the number of channels which are used by the multiple communicating unit. The control circuit includes a channel control circuit for controlling the number of channels which are used by the multiple communicating unit in accordance with a transmission speed. The multiple communicating unit includes a diffusion circuit for diffusing parallel data by a plurality of diffusion code series. The multiple communicating unit transmits a multiple number for a preamble period of time provided for the reception side to synchronize the plurality of code series which are used for a code division multiple with the transmission side.

48 Claims, 8 Drawing Sheets

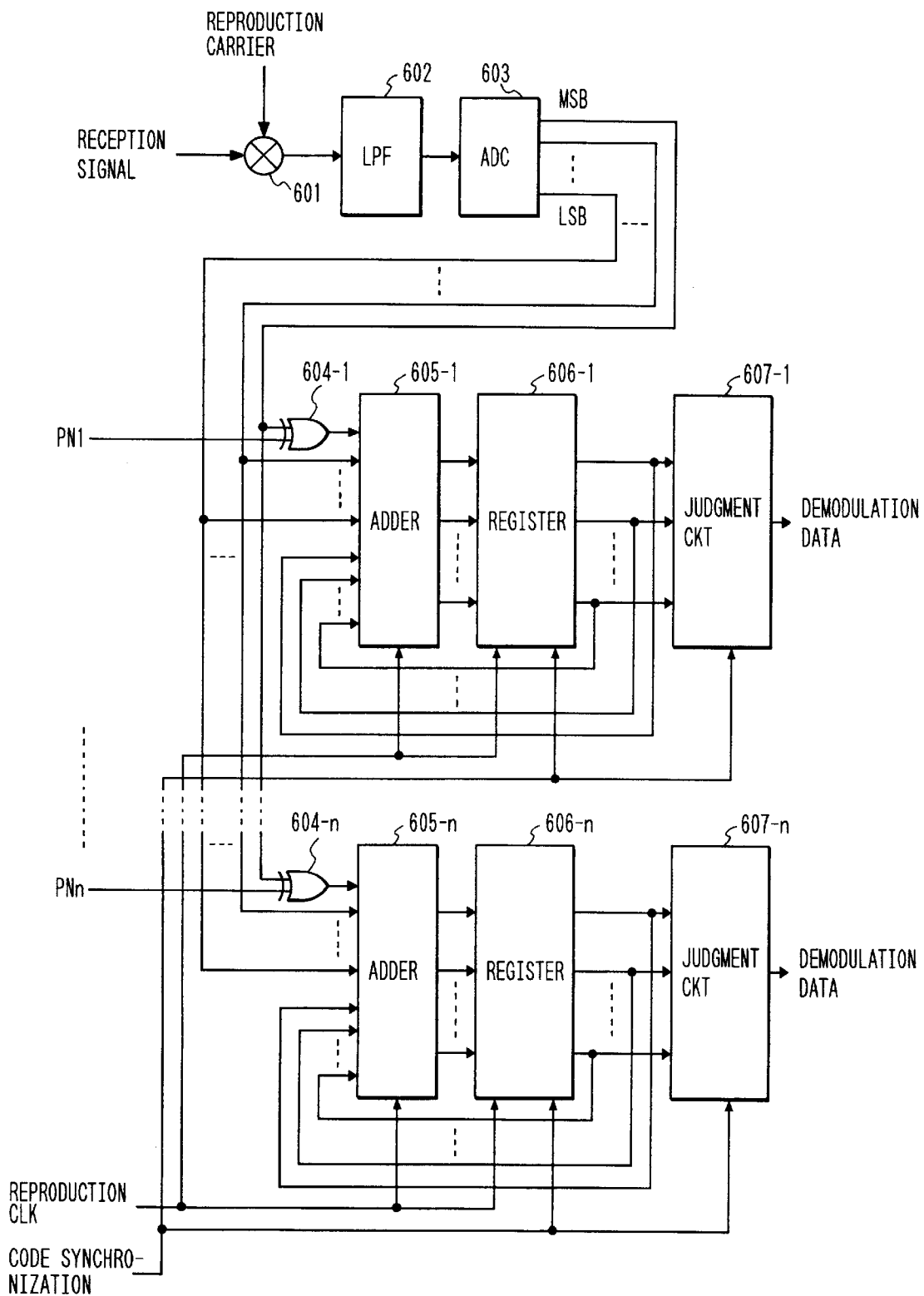

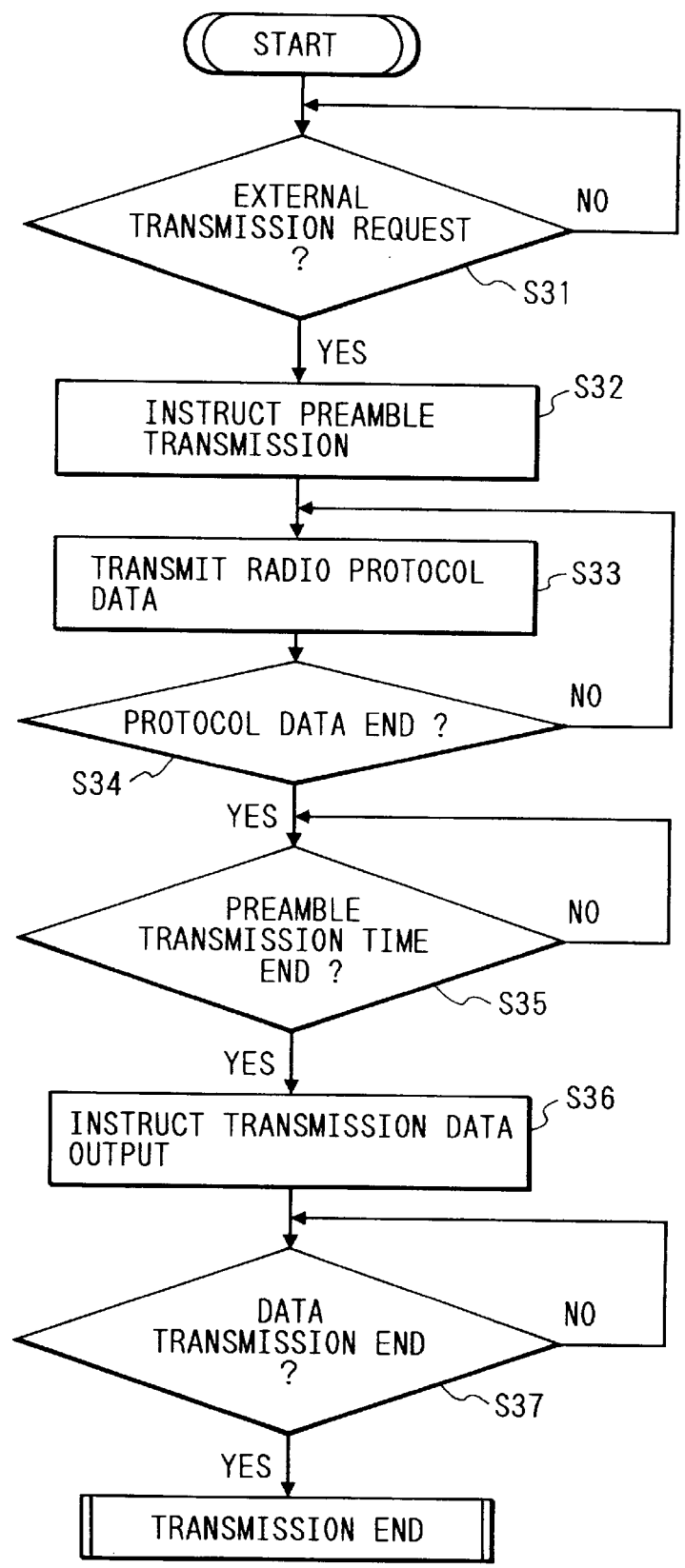

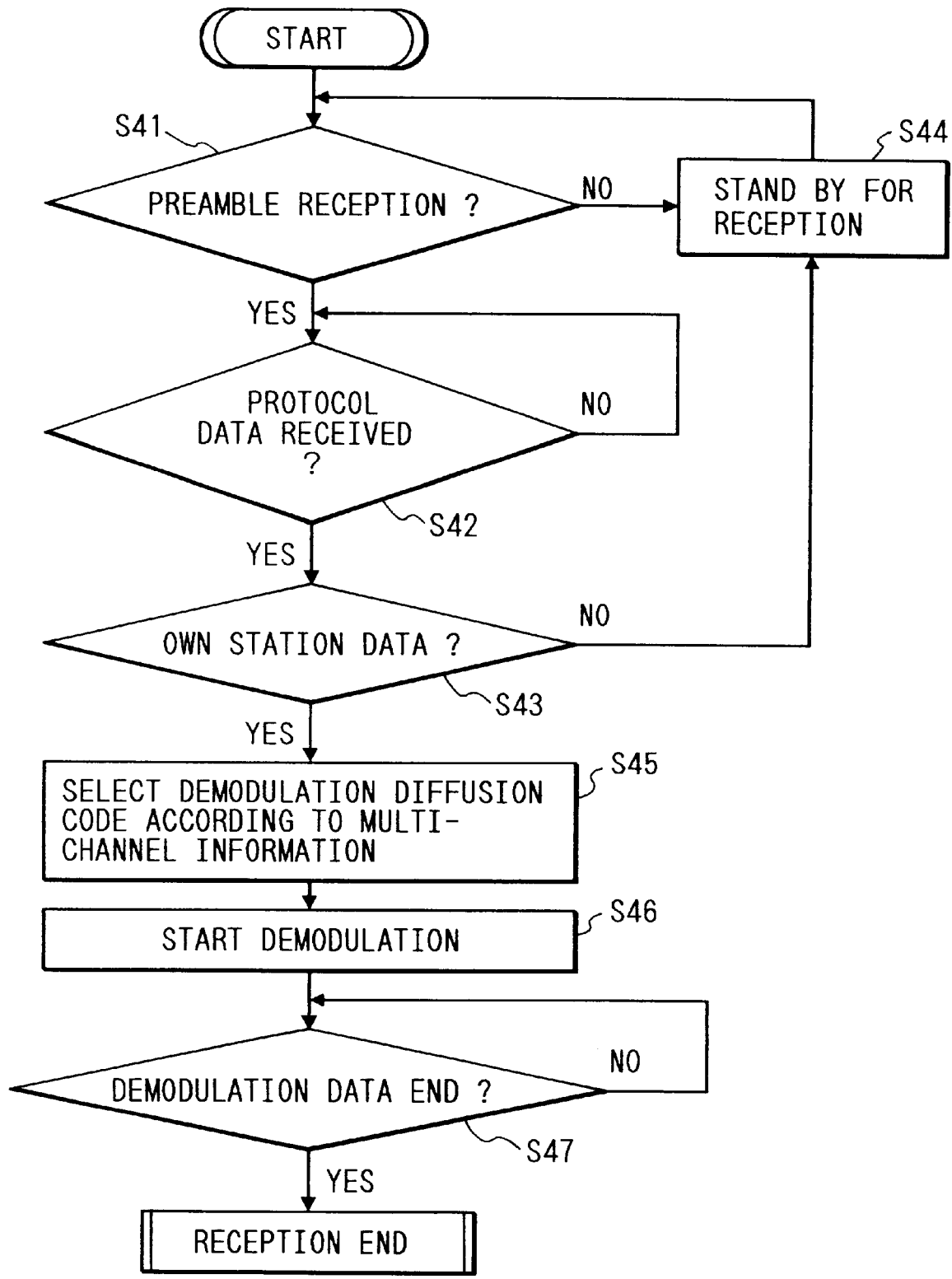

MULTI-CHANNEL COMMUNICATION

BACKGROUND OF THE INVENTION

1. Field of the Invention

The present invention relates to multi-channel communicating apparatus and method for communicating through a plurality of multiplexed channels (hereinafter, such communication is sometimes referred to as "multiple communication").

2. Related Background Art

As multiple communication techniques, there are a code-divisional multiple communication, a time-divisional multiple communication, and the like.

Even in a case of forming a plurality of channels by code division or even in a case of forming a plurality of channels by time division, when a communication is performed between a transmitting apparatus and a receiving apparatus by using a plurality of channels, data can be transmitted at a speed higher than that in a case of communicating by using one channel.

However, when the multiple number is extremely large, the comsumption of transmission electric power increases, so that there is a fear of adverse influence on other communication.

SUMMARY OF THE INVENTION

It is an object of the invention to improve such multiple communication.

Another object of the invention is to optimize use of transmission electric power in a multiple communication.

One aspect of the invention is to provide a communicating apparatus or method for controlling in the manner such that when the multiple number is small, the transmission electric power consumed by every channel is larger than that in the case where the multiple number is large.

Another aspect of the invention is to provide a communicating apparatus or method for controlling so as to keep transmission electric power constant irrespective of the number of channels in a code-divisional multiple communication.

Another aspect of the invention is to improve an efficiency of a communication by transmitting a multiple number in a preamble period of time for a code synchronization in a code-divisional multiple communication in which a transmission electric power is controlled in accordance with the multiple number.

The above and other objects and features of the present invention will become apparent from the following detailed description and the appended claims with reference to the accompanying drawings.

BRIEF DESCRIPTION OF THE DRAWINGS

FIG. 6 is a block diagram showing a construction of a base-band demodulation circuit in that embodiment;

FIG. 7 is a flowchart showing the transmitting operation of the transmitter in that embodiment;

FIG. 8 is a flowchart showing the receiving operation of the receiver in that embodiment.

DETAILED DESCRIPTION OF THE PREFERRED EMBODIMENTS

Figure 1:
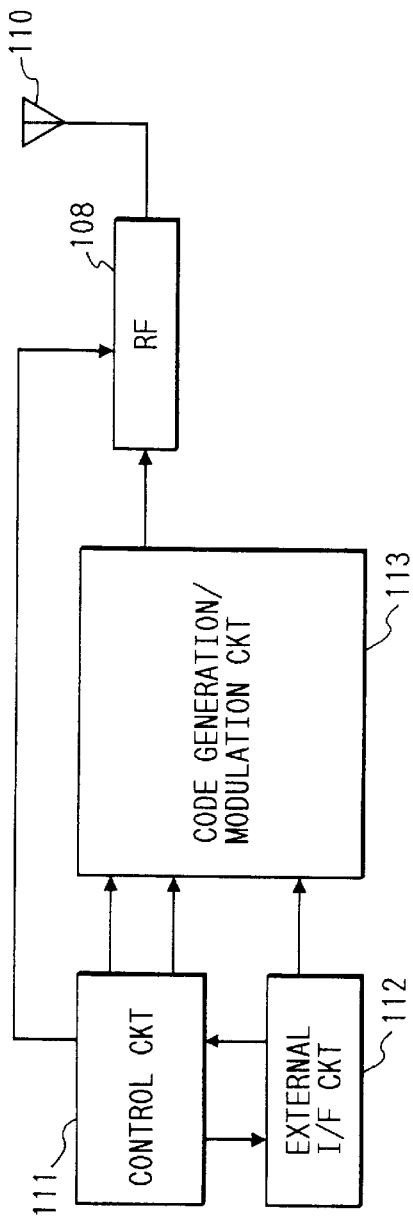
FIG. 1 is a block diagram showing a schematic construction of a transmitter in an embodiment of the invention.

FIG. 1 is a block diagram showing a schematic construction of a transmission circuit of a communicating apparatus in which the invention is embodied. In the diagram, reference numeral 111 denotes a control circuit for performing a transmission control of a preamble, a transmission control of radio protocol information, a transmission control of data matched with a multiple number, and the like. The control circuit 111 can be also constructed by a circuit common to a control circuit 200 of a reception circuit, which will be described here in below.

Reference numeral 112 denotes an external interface (I/F) circuit for outputting a transmission request to the control circuit 111 when there is a transmission request from outside the apparatus and executes an operation to start a transmission of data or the like in accordance with a transmission instruction signal. Reference numeral 113 denotes a code generation/modulation circuit for modulating in accordance with the multiple number and selection code information which are outputted from the control circuit 111.

A transmission data source can be located in any one of the outside and the inside of the apparatus. In the case where the transmission data source is located in the apparatus, the external I/F circuit 112 is unnecessary.

Reference numeral 108 denotes a radio frequency stage (hereinbelow, referred to as an RF stage) for converting an output of the code generation/modulation circuit 113 to a transmission frequency signal; 110 a transmitting antenna for transmitting a signal from the RF stage 108 to a transmission path.

Figure 2:
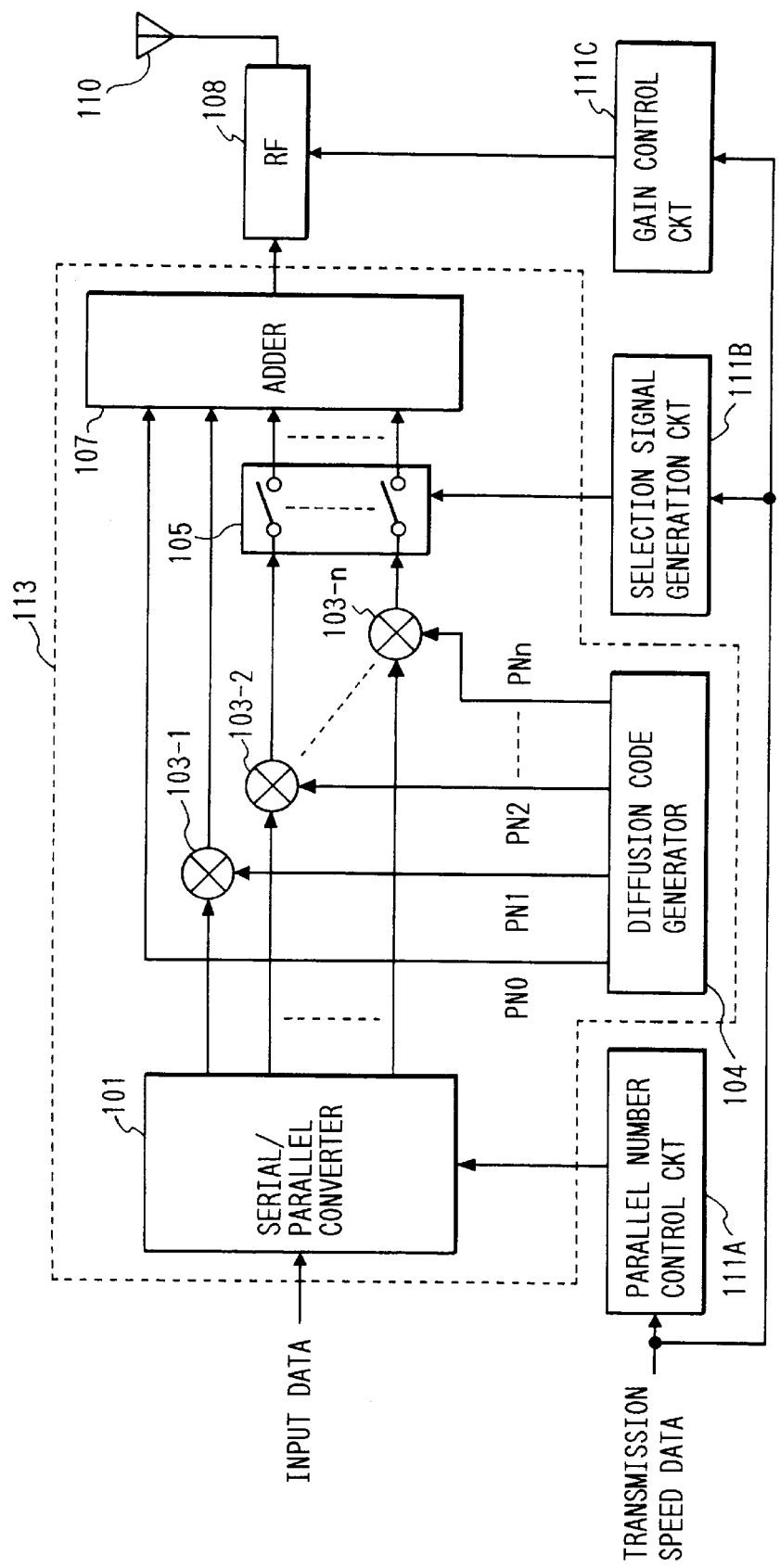
FIG. 2 is a block diagram showing the details of the construction of the transmitter in that embodiment.

FIG. 2 is a block diagram showing the details of the construction of a transmission circuit (particularly, the control circuit 111 and code generation/modulation circuit 113) to which the invention is embodied.

In FIG. 2, a serial/parallel converter 101 converts data which is serially inputted into (n) parallel data. The control circuit 111 is functionally separated into a parallel number control circuit 111A, a selection signal generation circuit 111B, and a gain control circuit 111C. The parallel number control circuit 111A arithmetically operates a code-division multiple number (m) from transmission speed data which was inputted and sets an output of the serial/parallel converter 101 to (m) symbols.

Multipliers 103-1 to 103-n multiply parallel data and (n) diffusion codes which are outputted from a diffusion code generator 104. The diffusion code generator 104 generates different (n) diffusion codes PN1 to PNn and a diffusion code PN0 for synchronization.

A group of switches 105 select and output only an output which was set by the selection signal generation circuit 111B from (n−1) outputs of the multipliers 103-2 to 103-n. The selection signal generation circuit 111B controls the switches 105 so as to select code channels of the number corresponding to the code division multiple number from the inputted transmission speed data.

An adder 107 adds the diffusion code for synchronization which is outputted from the diffusion code generator 104, an output of the multiplier 103-1, and 0 to (n−1) outputs of the switches 105.

The gain control circuit 111C controls a transmission output of the RF stage 108 in accordance with the multiple number.

Figure 3:
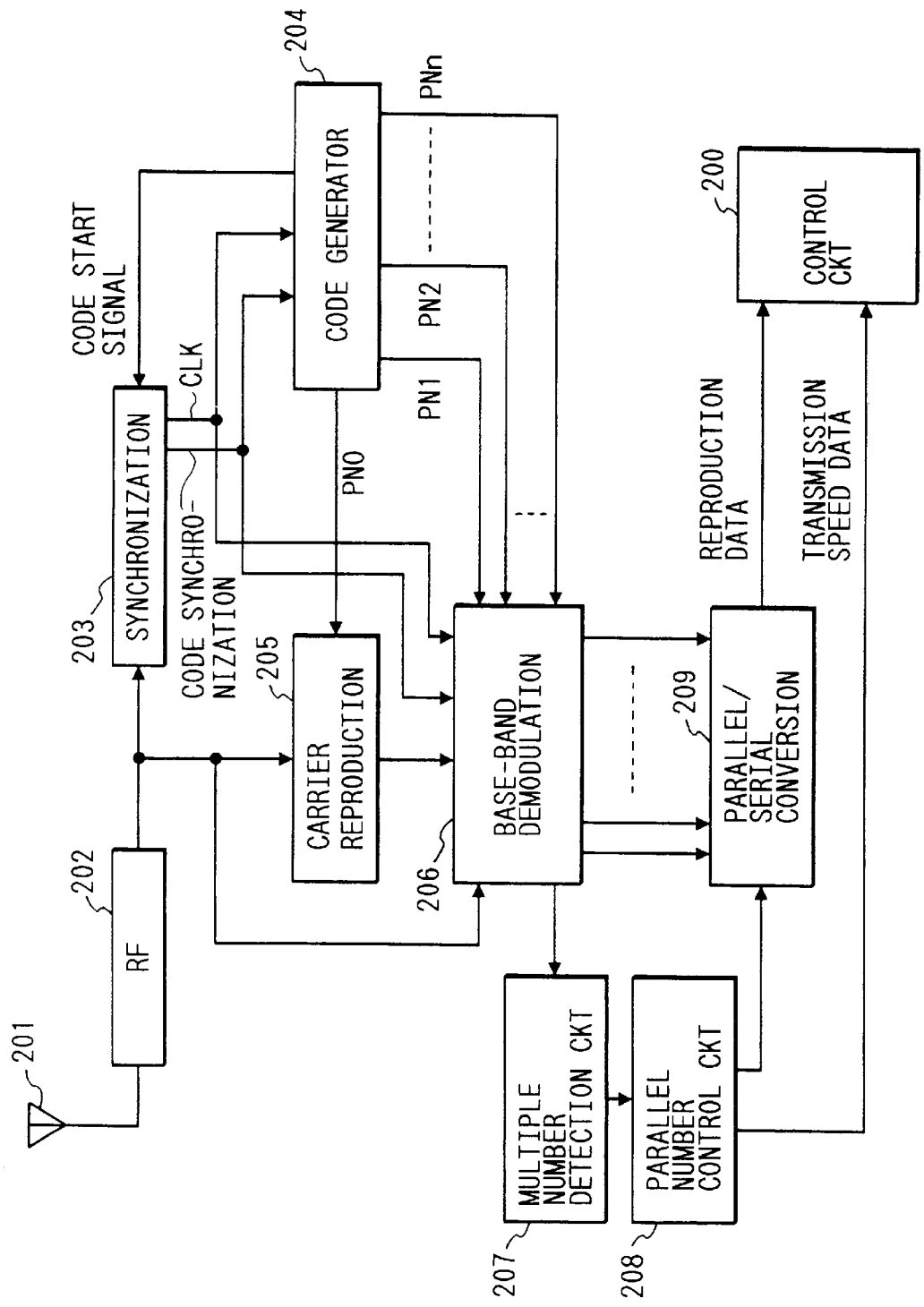
FIG. 3 is a block diagram showing a construction of a receiver in that embodiment.

FIG. 3 is a block diagram showing a construction of a reception circuit of the communicating apparatus to which the invention is embodied. In FIG. 3, a receiving antenna 201 receives a signal from the transmission path.

A radio frequency signal processing unit 202 properly filters and amplifies an output from the receiving antenna 201 and converts to a predetermined frequency band signal.

A synchronization circuit 203 captures and maintains a synchronization for the diffusion code on the transmission side and a clock. A diffusion code generator 204 generates same (n+1) diffusion codes PN0 to PNn as the diffusion codes on the transmission side by a code synchronization signal and a clock signal which are inputted from the synchronization circuit 203.

A carrier reproduction circuit 205 reproduces a carrier signal from the diffusion code PN0 for carrier reproduction which is outputted from the diffusion code generator 204 and an output of the radio frequency signal processing unit 202.

A base-band demodulation circuit 206 executes a demodulation in a base band by using an output of the carrier reproduction circuit 205, an output of the RF signal processing unit 202, and the (n) diffusion codes PN1 to PNn as outputs of the diffusion code generator 204.

A multiple number detection circuit 207 detects the number of transmitted code channels from a group of correlation values of the base-band demodulation circuit 206. A parallel number control circuit 208 controls the parallel number in the parallel/serial conversion by a parallel/serial converter 209 from an output of the multiple number detection circuit 207 and also outputs transmission speed data. The parallel/serial converter 209 performs a parallel/serial conversion to 1 to (n) parallel demodulation data as outputs of the base-band demodulation circuit 206 in accordance with an output of the parallel number control circuit 208.

In the above-mentioned construction, on the transmission side, the inputted transmission speed data is first inputted to the parallel number control circuit 111A and the number of parallel output symbol of the serial/parallel converter 101 is decided. Subsequently, data to be transmitted is converted to (m) parallel data which number is equal to the parallel number by the serial/parallel converter 101.

The diffusion code generator 104 generates the different diffusion codes PN0 to PNn having the same (n+1) code periods. Among them, PN0 denotes a code for synchronization and carrier reproduction and is not modulated by the parallel data but is directly supplied to the adder 107. The remaining (n) diffusion codes are modulated by the (n) parallel data by the multipliers 103-1 to 103-n. Only the (m) data among the (n) modulated data are necessary data and are selected through the switches 105 by a selection signal as an output of the selection signal generation circuit 111B which is controlled by the transmission speed data. The selected (m) signals are subsequently inputted to the adder 107.

The adder 107 linearly adds the inputted (m+1) signals and outputs the added base band signal to the RF stage 108. The base-band signal is subsequently converted to a radio frequency signal having a proper center frequency in the RF stage 108 and is transmitted by the transmitting antenna 110.

In this instance, in order to set a total average output of the transmission signal to a predetermined value irrespective of the multiple number, an output per channel has to be varied. Therefore, in order to set the output per channel to a gain according to the multiple number, there is provided the gain control circuit 111C for controlling the transmission output per channel so as to set the whole transmission output from the transmission speed data to be constant.

On the reception side, the signal received by the receiving antenna 201 is properly filtered and amplified by the RF signal processing unit 202 and is directly outputted as a transmission frequency band signal or is converted to a proper intermediate frequency band signal and is outputted.

Such a signal is inputted to the synchronization circuit 203. In the synchronization circuit 203, the diffusion code synchronization and clock synchronization for the transmission signal are established and the code synchronization signal and clock signal are outputted to the diffusion code generator 204. As a construction of the synchronization circuit, for example, a circuit using a surface acoustic wave (SAW) matched filter as shown in FIG. 4 is used.

Figure 4:
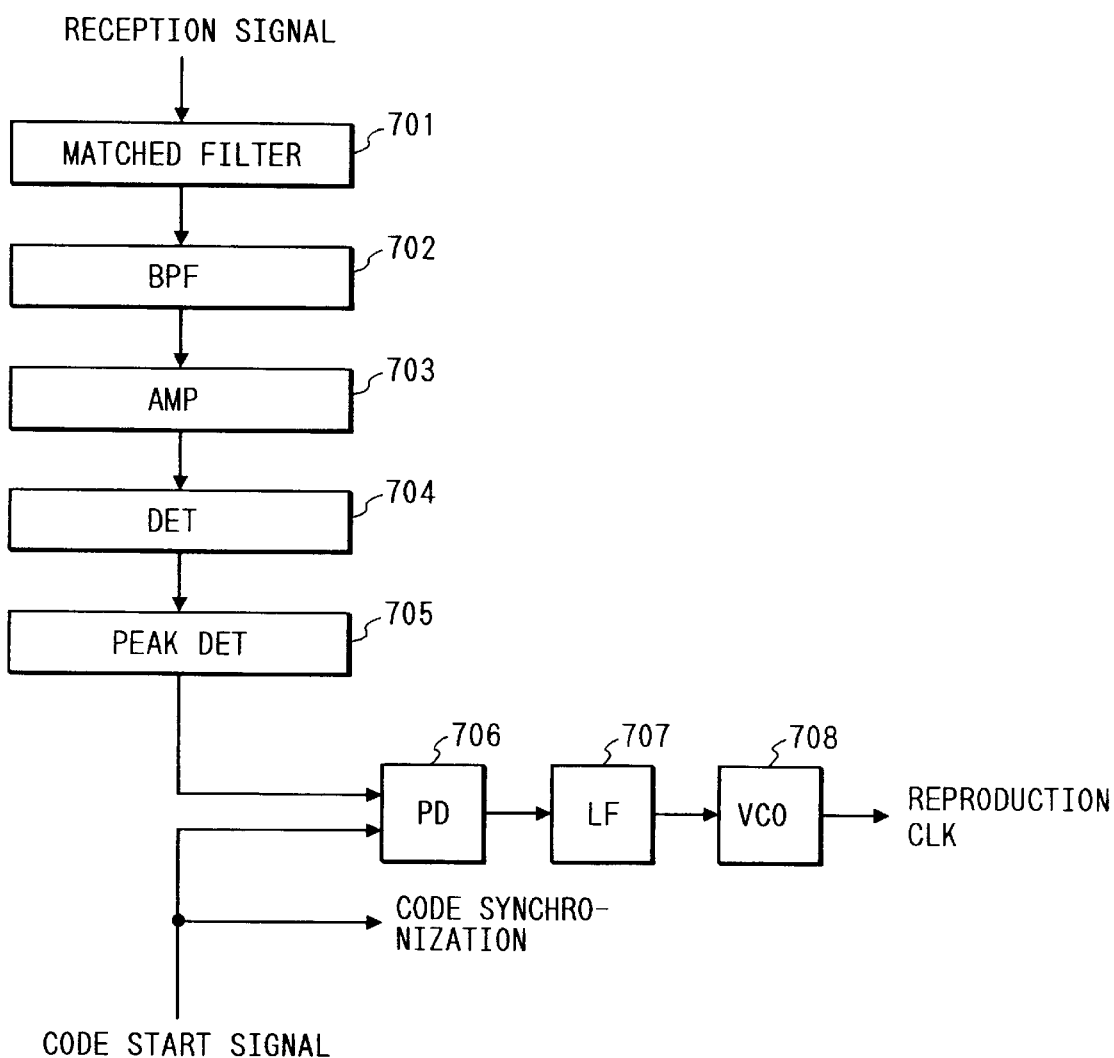
FIG. 4 is a block diagram showing a construction of a synchronization circuit of that embodiment.

In FIG. 4, the reception intermediate frequency band signal is inputted to an SAW matched filter 701. The SAW matched filter 701 has an integrated area length corresponding to one period of the diffusion code and also has an envelope which is proportional to a result (correlation integrated value) obtained by integrating a product of the reception signal and a preset tap coefficient, namely, a code series PN0 for synchronization for one period of the diffusion code. The SAW matched filter 701 outputs a voltage signal whose center frequency is equivalent to a carrier frequency of the input signal.

The output passes through a band pass filter (BPF) 702 in which an input frequency of the matched filter 701 is set to a center frequency and which blocks signals other than the correlation integration signal and is properly amplified by an amplifier 703. After that, an envelop of the resultant output is detected by an envelope detector 704.

Since such an envelope signal indicates an absolute value of the correlation integrated value, auto-correlation characteristics of the diffusion code for synchronization has a sharp peak at a synchronization point and has a sufficient low side lobe at other points. Therefore, when an exclusive-use diffusion code component for synchronization is included in the reception signal, a steep peak appears in an output of the envelope detector 704. A peak detection circuit 705 detects such a steep peak and outputs the peak to a phase detector 706.

The phase detector 706 detects a phase difference between the peak and a code start signal indicative of a start point of a period of the diffusion code which is generated from the code generator 204 and outputs a voltage level according to the phase difference. The voltage level is smoothed by a loop filter 707 and is outputted to a voltage controlled oscillator (VCO) 708. The VCO 708 generates a clock signal of a frequency according to the inputted voltage level and outputs the signal as a clock of the diffusion code generator 204. The diffusion code start signal is outputted as a code synchronization signal to the code generator 204 and base-band demodulation circuit 206.

The synchronization circuit 203 and code generator 204 constructs a kind of phase-locked loop as a whole. Since a phase difference exists between the correlation peak signal as an input of the phase detector 706 and the diffusion code start signal in a state in which the synchronization is not established, the diffusion code clock is advanced (or delayed). Thus, the phase difference between the diffusion code component for synchronization included in the reception signal and the diffusion code start signal gradually decreases. When the phases of them coincide, the phase difference of the phase detector 706 is equal to 0 and, after that, the phase difference is controlled so as to be equal to 0.

After the establishment of the synchronization, the diffusion code generator 204 generates a group of diffusion codes in which the clocks and the diffusion code phases coincide with those of a group of diffusion codes on the transmission side. The diffusion code PN0 for synchronization among the group of those codes is supplied to the carrier reproduction circuit 205. The carrier reproduction circuit 205 inversely diffuses the reception signal which was converted to a transmitting frequency or intermediate frequency band as an output of the RF signal processing unit 202 by the diffusion code PN0 for synchronization and reproduces a carrier of the transmitting frequency or intermediate frequency band. As a construction of the carrier reproduction circuit 205, for example, a circuit using a phase-locked loop as shown in FIG. 5 is used.

Figure 5:
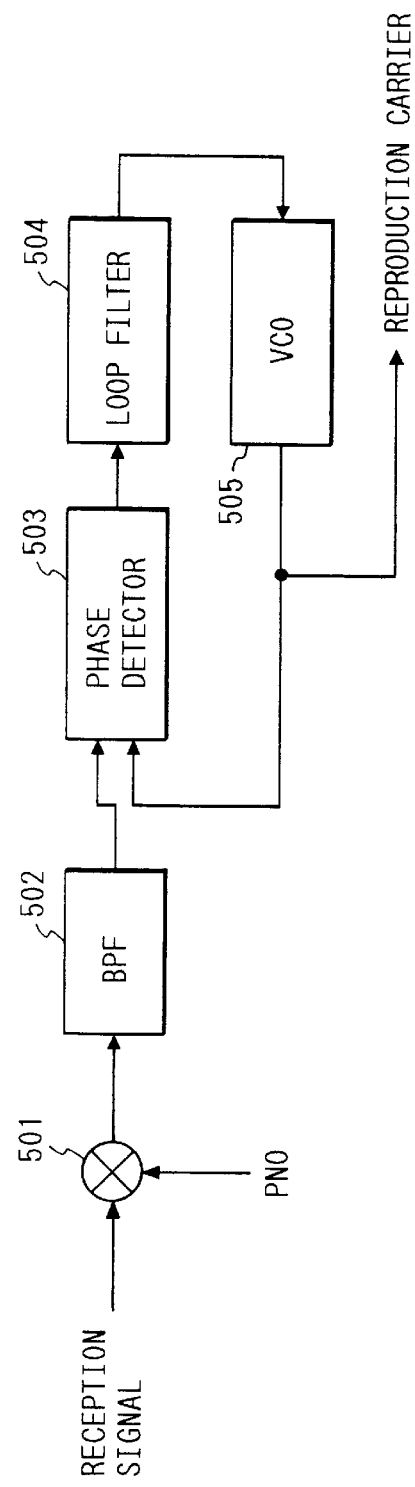
FIG. 5 is a block diagram showing a construction of a carrier reproduction circuit in that embodiment.

In FIG. 5, the reception signal and the diffusion code PN0 for synchronization are multiplied by a multiplier 501. After the establishment of the synchronization, the clock and the code phase of the diffusion code for synchronization in the reception signal coincide with those of the diffusion code for synchronization for reference and the diffusion code for synchronization on the transmission side is not modulated by data. Therefore, the reception signal is inversely diffused by the multiplier 501 and a component of the carrier appears in an output of the multiplier 501.

The output is subsequently inputted to a band pass filter (BPF) 502 and only a carrier component is extracted and outputted. The output is inputted to a phase-locked loop constructed by a phase detector 503, a loop filter 504, and a voltage controlled oscillator (VCO) 505. With such a construction, a signal which is outputted from the BPF 502 and whose phase is locked with the carrier component is outputted as a reproduction carrier by the VCO 505.

The reproduced carrier is inputted to the base-band demodulation circuit 206. The base-band demodulation circuit 206 forms a base band signal from the reproduction carrier and an output of the RF signal processing unit 202. The base band signal is distributed to (n) branches and is inversely diffused every code division channel by the group of diffusion codes PN1 to PNn as outputs of the diffusion code generator 204. Subsequently, data is demodulated. The base-band demodulation circuit 206 is constructed as shown in, for example, FIG. 6.

In FIG. 6, the inputted reception signal and the reproduction carrier are multiplied by a multiplier 601 and an unnecessary signal is eliminated by a low pass filter (LPF) 602, so that the reception signal is converted to a base band signal. The base band signal is converted to a digital signal having a resolution of a single bit or a plurality of bits by an A/D converter 603 using a reproduction clock as a sampling period. The digital signal is distributed to (n) branches, the exclusive OR of the most significant bit (code bit) of the digital signal at each branch and each of the diffusion codes PN1 to PNn as outputs of the diffusion code generator 204 is calculated by each of a group of exclusive OR circuits 604-1 to 604-n. The calculated EX-ORs are inputted to a group of adders 605-1 to 605-n together with the other bits. The adders 605-1 to 605-n add the input signals and outputs of registers 606-1 to 606-n every reproduction clock pulse and the resultant addition signals are outputted to the registers 606-1 to 606-n.

The registers 606-1 to 606-n have been reset at a time point when a head bit of each diffusion code is inputted.

After that, the result obtained by adding products of the reception signals and the diffusion signals for one period of the diffusion codes are stored. Therefore, at a time point when a final bit of one period of the diffusion codes is inputted, correlation values between the one period of each diffusion code and the reception signal are stored in the registers 606-1 to 606-n. Data of the correlation values is judged by subsequent judgement circuits 607-1 to 607-n, so that (n) parallel demodulation data are obtained. The correlation values stored in the registers 606-1 to 606-n are subsequently inputted to the multiple number detection circuit 207.

In the multiple number detection circuit 207, when an absolute value of the correlation value in each of the code channels stored in the registers 606-1 to 606-n is equal to or smaller than a predetermined value, it is judged that no data is transmitted through the relevant channel. That is, the multiple number detection circuit 207 counts the number of code channels in which the absolute value of the correlation value is equal to or larger than the predetermined value and outputs the count value as a multiple number to the parallel number control circuit 208.

The parallel number control circuit 208 controls the parallel number of the parallel/serial converter 209 in accordance with the inputted multiple number and also generates transmission speed data which is directly derived from the multiple number.

The parallel number is set into the parallel/serial converter 209 by the parallel number control circuit 208. The converter 209 selects only (m) valid data among (n) parallel demodulation data demodulated by the base-band demodulation circuit 206, converts to serial data, and generates the serial data.

In the above-mentioned embodiment, although the multiple number is detected on the basis of the reception results of the multiple channels on the reception side, the multiple number can be also transmitted as control data from the transmission side to the reception side. An embodiment in which the multiple number is included in protocol data will now be described. In this embodiment, there is provided a multiplier 103-0 to diffuse protocol data by the diffusion code PN0 in a manner similar to the diffusion codes PN1 to PNn in FIG. 2. An exclusive OR circuit 604-0, an adder 605-0, a register 606-0, and a judgment circuit 607-0 for inversely diffusing the reception signal by the diffusion code PN0 are provided in a manner similar to the diffusion codes PN1 to PNn in FIG. 6. In FIG. 2, the output of the multiplier 103-1 is also inputted to the switches 105. Further, in FIG. 3, the multiple number detection circuit 207 and parallel number control circuit 208 are included in the control circuit 200.

FIG. 7 is a flowchart showing the transmitting operation, and FIG. 8 is a flowchart showing the receiving operation.

First in step S31, on the transmission side of the communicating apparatus, the control circuit 111 of the transmission circuit shown in FIG. 1 waits until a transmission request signal is inputted from the external I/F circuit 112. When the transmission request signal is received from the external I/F circuit 112 (YES in step S31), a preamble transmission instruction signal is generated to the code generation/modulation circuit 113 (step 532), thereby activating an internal counter to count a predetermined preamble transmitting time. After that, radio protocol data (for example, address information, multi-channel information, or the like to specify a receiving terminal) is transmitted to the code generation/modulation circuit 113 (step S33). The completion of the protocol data transmission and a time-over of a preamble transmitting time are monitored (step S34).

For example, in the case where up to 16 channels can be multiplexed, the multiple number is set to 16 channels or less in accordance with the transmission speed. The multi-channel information to notify the reception side of the multiple number set on the transmission side is transmitted.

The code generation/modulation circuit 113 which received the preamble transmission instruction signal sets the transmission diffusion code to one diffusion code PN0 allocated for a preamble and, after that, holds it until the multiplier 103-0 (not shown) modulates the radio protocol data by the diffusion code PN0, transmits the modulated data, and receives the transmission data output instruction signal. The switches 105 operate so that outputs of the multipliers 103-1 to 103-n are not inputted to the adder 107. Now assuming that a sum of the transmission electric powers of the (n) channels in case of multiplexing the (n) channels is set to P, the gain control circuit 111C controls the gain so that a transmission electric power of the preamble in which the multiple number is equal to 1 is also set to P. At a time point when the preamble transmitting time is over (YES in step S35), the control circuit 111 transmits a transmission data instruction signal using a data multi-channel according to the multi-channel information to the external I/F circuit 112 and code generation/modulation circuit 113 (step S36).

The external I/F circuit 112 which received the signal transmits the transmission data to be transmitted. The code generation/modulation circuit 113 modulates the data transmitted from the external I/F circuit 112 by the codes PN1 to PNm selected as diffusion codes for data transmission and transmits the modulated data. The switches 105 operate in a manner such that the outputs of the multipliers 103-2 to 103-n are inputted to the adder 107. Even when the multiple number (m) is any value, the gain control circuit 111C controls the gain so that the sum of the transmission electric powers of (m) channels is set to a predetermined value (P). When a transmission data end signal is outputted from the external I/F circuit 112 to the control circuit 111, the control circuit 111 judges that the data transmission has been finished (YES in step S37) and generates a transmission end signal to the code generation/modulation circuit 113. The code generation/modulation circuit 113 which received such a signal completes the transmission and finishes the operation.

On the reception side, when there is no reception signal, the control circuit 200 enters a stand-by mode for reception and monitors the preamble (steps S41 and S44). When the signal is received, a correlation output is generated from the matched filter 701 of the synchronization circuit 203 and is detected by the peak detection circuit 705.

The control circuit 200 detects the preamble by the correlation peak detected as mentioned above. The synchronization circuit 203 starts a synchronization capturing operation by the phase detector 706 so as to match the phases of the correlation peak from the matched filter 701 and the code generation timing signal generated from the code generator 204.

The received signal becomes a base band signal by the base-band demodulation circuit 206 and is also demodulated by using the sampling clock. The obtained demodulation data is transmitted to the control circuit 200.

The control circuit 200 reads out the demodulated protocol data (step S42) and analyzes the data. In the case where the reception data is the data to the own station (YES in step S43), the control circuit 200 generates a demodulation instruction signal and a multi-channel information signal indicative of the multiple number (m) to the base-band demodulation circuit 206 and parallel/serial converter 208. The base-band demodulation circuit 206 and parallel/serial converter 208 which received the demodulation instruction signal demodulate a multiple base band signal which was synchronization detected by a carrier signal reproduced by the carrier reproduction circuit 205 and the reception signal by using the clock reproduced by the synchronization circuit 203 and the (m) multi-channel diffusion codes PN1 to PNm which are used and select and output the data of the (m) effective channels among the (n) channels (steps S45 and S46).

When it is judged that the reception data is not the own station data (NO in step S43), the control circuit 200 doesn't output the demodulation instruction signal but is returned to the reception stand-by state until the next preamble is detected (step S44). In step S47, when the reception data is completed in the base-band demodulation circuit 206 (it is judged by the correlation value or the like), the base-band demodulation circuit 206 generates a completion signal of the reception data to the control circuit 200. The control circuit 200 which received the completion signal is returned to the reception stand-by state.

Figure 9:
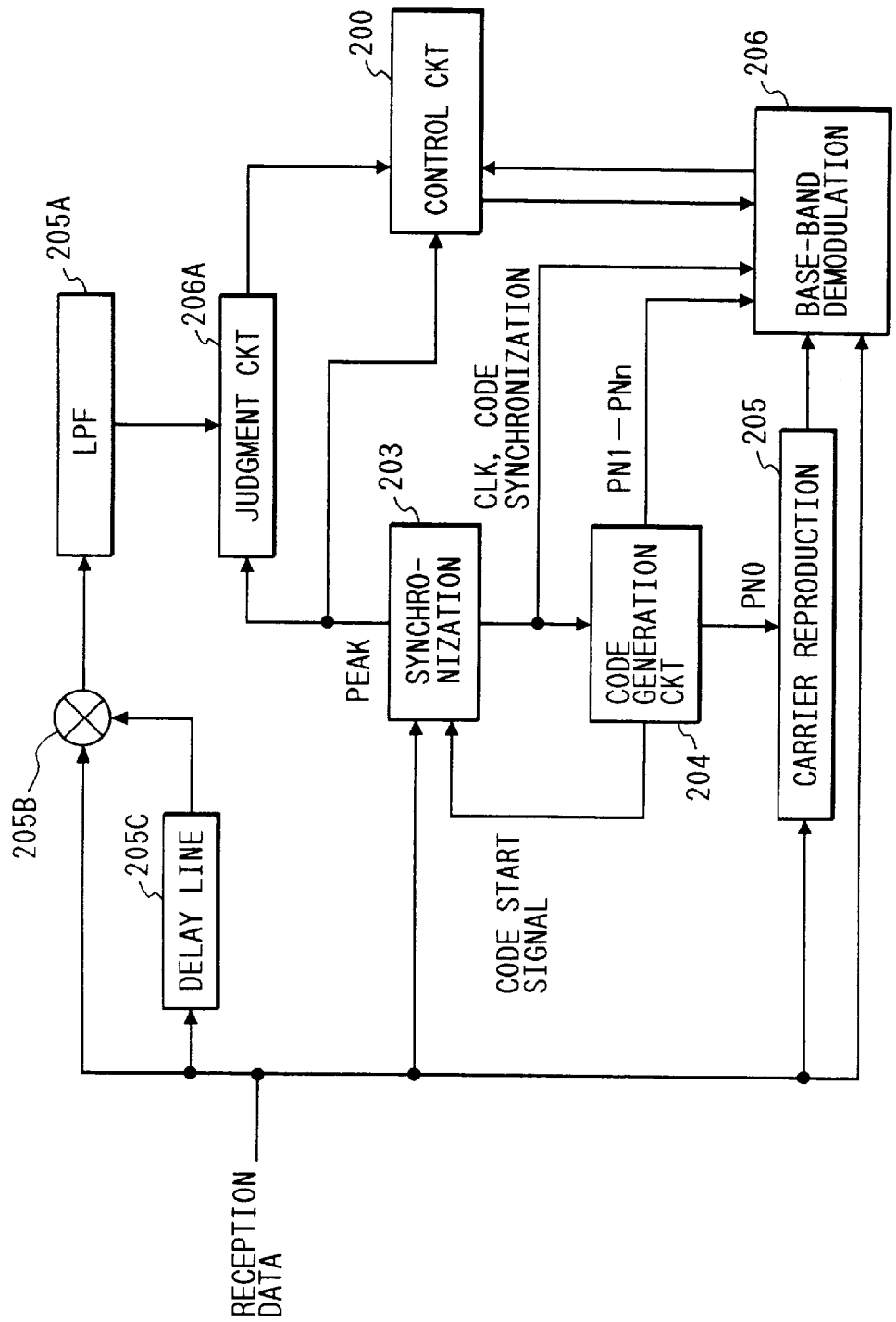
FIG. 9 is a block diagram showing a construction of a receiver in a modification.

FIG. 9 shows a modification of the receiving circuit in the foregoing embodiment.

In FIG. 9, circuits 205A, 205B, 205C, and 206A for demodulating protocol data are provided separately from the circuits 204, 205, and 206 for demodulating multiple data.

In FIG. 9, reference numeral 200 denotes the control circuit for controlling the detection of the preamble, the analysis of the radio protocol information, the demodulation of the multi-channel data, and the like; 204 the code generation circuit for generating the diffusion codes PN1 to PNn to demodulate the multiple data and the diffusion code PN0 to reproduce a carrier and for selecting and outputting the diffusion codes in accordance with the multi-channel information included in the radio protocol information shown; and 203 the synchronization circuit shown in FIG. 3. A diffusion code chip rate clock is outputted from the synchronization circuit 203.

Reference numeral 206A denotes a judgment circuit for sampling the base band signal of the data transmitted for the preamble period of time by using the correlation peak of the matched filter 701 detected by the peak detection circuit 705 of the synchronization circuit 203, thereby demodulating the data; 205A a low pass filter for allowing a signal of a band of the base band signal to pass; 205B a mixer for performing a delay detection; 205C a delay line having a delay amount of one code period; 206 the demodulation circuit shown in FIG. 6 for demodulating the multiple signal; and 205 the carrier reproduction circuit shown in FIG. 3 for reproducing the synchronization carrier from the multiple diffusion signal.

The SAW matched filter 701 is not limited to an ordinary analog type filter but, for example, a digital matched filter can be also used.

On the reception side, when there is no reception signal, the control circuit 200 enters the reception stand-by mode and monitors the preamble (steps S41 and S44). When the signal is received, a correlation output is first generated from the matched filter 701 of the synchronization circuit 203 and is detected by the peak detection circuit 705 and is supplied to the control circuit 200 and judgment circuit 206A.

By the correlation peak detected as mentioned above (YES in step S41), the control circuit 200 detects the preamble on the basis of an output of the judgment circuit 206A. The synchronization circuit 203 starts the synchronization capturing operation by the phase detector 706 so as to match the phases of the correlation signal from the matched filter 701 and the code generation timing signal that is outputted from the code generator 204. The judgment circuit 206A also forms a sampling clock of the synchronization detection signal from the correlation peak.

The received signal is delayed by one code period by the delay line 205C. The delayed signal and the reception signal are delay-detected by the mixer 205B. The resultant signal becomes the base band signal through the filer 205A having a band width of the base band. The base band signal is inputted to the judgment circuit 206A. The judgment circuit 206A which received the signal demodulates it by using the sampling clock and transmits the obtained demodulation data to the control circuit 200.

The control circuit 200 reads out the demodulated protocol data (step S42), analyzes the data, and outputs a demodulation instruction signal and a multi-channel information signal indicative of the multiple number (m) to the baseband demodulation circuit 206 in the case where the reception data is the own station data (YES in step S43). The demodulation circuit 206 which received the demodulation instruction signal demodulates the multiple base band signal which was synchronization detected by the carrier signal reproduced by the carrier reproduction circuit 205 and the reception signal by using the clock reproduced by the synchronization circuit 203 and the (m) multiple channel diffusion codes PN1 to PNm which are used and selects and outputs the data of the (m) effective channels among the (n) channels (steps S45 and S46).

Processes if NO in step S43 and processes after step S47 are the same as those described before.

As mentioned above, the radio protocol information is enabled to be transmitted for the preamble period of time necessary for a synchronization capture and the data channel multiple information is included in the radio protocol information, so that an intensity of an electric field which is applied to each data channel can be varied. Thus, a flexible system such that an error rate is improved, a whole throughput is improved, the number of simultaneous communicating terminals is controlled in accordance with an increase/decrease in channel multiple number, and the like can be constructed.

Further, since necessary information can be transmitted by the radio protocol in the preamble period of time necessary to pull in and a timing for starting the subsequent multiplexed data can be detected, a signal to obtain a frame synchronization at a protocol level for a data period of time is unnecessary, so that the throughput can be improved.

Since a destination of a reception frame can be known for the preamble period of time, it is unnecessary to demodulate the reception data of a station other than the own station, the electric power can be saved when other station data is received, and processes only at the time of the communication with the own station are executed in the control circuit in a period other than the preamble period of time. Therefore, a processing speed of the control circuit for performing an external interface control or the like can be also reduced and a reduction in costs of the parts of the apparatus and a low electric power consumption can be also realized.

As compare with the case of, for example, the 16-channel multiplex, a transmission electric power of each channel in case of the 8-channel multiplex is doubled. Consequently, the sum of the transmission electric powers in the 8-channel multiplex is equal to that of the 16-channel multiplex. Thus, a noise resistance performance of the communicating apparatus can be improved.

In the above description, although the SAW matched filter has been used as a correlator, the invention is not limited to it but, for example, an SAW convolver can be also used. With respect to the demodulation circuit (205A, 205B, 205C and 206A) which operates for the preamble period of time, not only the demodulation circuit by the delay detection, but also, for example, a demodulation circuit by a synchronization detection can be used. Further, although one code has been used as a diffusion code at the time of the preamble, a diffusion code to be used in the data channel is used as a diffusion code for protocol data and is changed to a diffusion code for synchronization capturing, so that the demodulation circuits can be also shared.

Further, in the case where there are a plurality of clients, the diffusion code for preamble which is different every client can be also allocated as a diffusion code for preamble. Therefore, in the case where the number of channel multiple number in the communication per terminal is small, the simultaneous communication can be also asynchronously performed.

In the case where the apparatus is constructed in a manner such that a demodulation output of the baseband demodulation circuit 206 is inputted to a forward error correction circuit and error information from the forward error correction circuit is stored in the control circuit 200, a communicating state of a propagation path is detected and the multiple channel number can be varied in accordance with such a state.

The invention can be applied to a system constructed by a plurality of apparatuses and can be also applied to a system constructed by one apparatus. It will be obviously understood that the invention can be also applied to a case where the invention is embodied by supplying a program to a system or an apparatus. In this case, the invention is constructed by a memory medium in which the program according to the invention has been stored. By reading out the program from the memory medium to the system or apparatus, the system or apparatus operates in accordance with a predetermined procedure.

The invention has been described above with respect to the case of the multiple communication by the code division as an example. However, even in case of using the multiple communication other than the code division, for example, the multiple communication by a time division or the like, the invention can be embodied by controlling the transmission electric power of each channel so as to be inversely proportional to the number of channels in a manner such that the sum of the transmission electric powers is made constant irrespective of the number of channels. Thus, various modifications are possible within the scope of claims of the invention.

What is claimed is:

1. A multi-channel communicating apparatus comprising:
   communicating means for communicating a preamble signal and multi-channel data with a partner; and
   control means for controlling said communicating means so that a transmission power of each channel, which has a same destination, is inversely proportional to a number of channels which are used by said communicating means for communicating the multi-channel data when the multi-channel data is communicated after the preamble signal.

2. An apparatus according to claim 1, wherein said control means includes channel control means for controlling the number of channels which are used by said communicating means in accordance with a transmission speed.

3. An apparatus according to claim 1, wherein said communicating means includes spreading means for spreading parallel data by a plurality of spreading code sequence.

4. A multi-channel communicating apparatus comprising:

communicating means for communicating a preamble signal and multi-channel data with a partner; and control means for controlling said communicating means so that a transmission power of each channel is inversely proportional to a number of channels which are used by said communicating means for communicating the multi-channel data when the multi-channel data is communicated after the preamble signal, wherein said communicating means transmits a multiple number in the preamble signal which is provided for a reception side to synchronize a plurality of code sequences which are used for a code division multiplex with a transmission side.

5. An apparatus according to claim 1, further comprising:

receiving means for receiving the data transmitted through a plurality of channels by said communicating means; and reception control means for controlling said receiving means in accordance with the number of channels which are used by said communicating means.

6. A multi-channel communicating apparatus comprising:

communicating means for communicating a preamble signal and multi-channel data with a partner;

control means for controlling said communicating means so that a transmission power of each channel is inversely proportional to a number of channels which are used by said communicating means for communicating the multi-channel data when the multi-channel data is communicated after the preamble signal;

receiving means for receiving the data transmitted through a plurality of channels by said communicating means; and reception control means for controlling said receiving means in accordance with the number of channels which are used by said communicating means;

wherein said reception control means includes detecting means for detecting the number of channels on the basis of a reception result of the plurality of channels by said receiving means.

7. A multi-channel communicating apparatus comprising:

communicating means for communicating a preamble signal and multi-channel data with a partner;

control means for controlling said communicating means so that a transmission power of each channel is inversely proportional to a number of channels which are used by said communicating means for communicating the multi-channel data when the multi-channel data is communicated after the preamble signal;

receiving means for receiving the data transmitted through a plurality of channels by said communicating means; and reception control means for controlling said receiving means in accordance with the number of channels which are used by said communicating means;

wherein said reception control means includes detecting means for detecting the number of channels on the basis of de-spreading outputs by a plurality of de-spreading code sequences.

8. A multi-channel communicating apparatus comprising:

communicating means for communicating a preamble signal and multi-channel data with a partner;

control means for controlling said communicating means so that a transmission power of each channel is inversely proportional to a number of channels which are used by said communicating means for communicating the multi-channel data when the multi-channel data is communicated after the preamble signal;

receiving means for receiving the data transmitted through a plurality of channels by said communicating means; and reception control means for controlling said receiving means in accordance with the number of channels which are used by said communicating means;

wherein said reception control means includes preamble receiving means for receiving the number of channels included in the preamble signal which is provided for a reception side to synchronize a plurality of code sequences which are used for a code-division multiplex with a transmission side.

9. A multiple communicating method comprising:

a preamble signal communicating step of communicating a preamble signal with a partner;

a multi-channel data communicating step of communicating multi-channel data with the partner; and a control step of controlling execution of said multi-channel data communicating step in a manner such that a transmission power of each channel, which has a same destination, is inversely proportional to a number of channels which are used in said multi-channel data communicating step for communicating the multi-channel data when the multi-channel data is communicated after the preamble signal.

10. A method according to claim 9, wherein said control step includes a channel control step of controlling the number of channels which are used in said multi-channel data communicating step in accordance with a transmission speed.

11. A method according to claim 9, wherein said multi-channel data communicating step includes a spreading step of spreading parallel data by means of a plurality of spreading code sequences.

12. A multiple communicating method comprising:

a preamble signal communicating step of communicating a preamble signal with a partner;

a multi-channel data communicating step of communicating multi-channel data with the partner; and a control step of controlling execution of said multi-channel data communicating step in a manner such that a transmission power of each channel is inversely proportional to a number of channels which are used in said multi-channel data communicating step for communicating the multi-channel data when the multi-channel data is communicated after the preamble signal;

wherein said preamble signal communicating step includes transmitting a multiple number in the preamble signal which is provided for a reception side to synchronize a plurality of code sequences which are used for a code division multiplex with a transmission side.

13. A method according to claim 9, further comprising:

a receiving step of receiving the data transmitted through a plurality of channels in said multi-channel data communicating step; and a reception control step of controlling execution of said receiving step in accordance with the number of channels which are used in said multi-channel communicating step.

14. A multiple communicating method comprising:

a preamble signal communicating step of communicating a preamble signal with a partner;

a multi-channel data communicating step of communicating multi-channel data with the partner;

a control step of controlling execution of said multi-channel data communicating step in a manner such that a transmission power of each channel is inversely proportional to a number of channels which are used in said multi-channel data communicating step for communicating the multi-channel data when the multi-channel data is communicated after the preamble signal;

a receiving step of receiving the data transmitted through a plurality of channels in said multi-channel data communicating step; and a reception control step of controlling execution of said receiving step in accordance with the number of channels which are used in said multi-channel communicating step, wherein said reception control step includes a detecting step of detecting the number of channels on the basis of a reception result of the plurality of channels in said receiving step.

15. A multiple communicating method comprising:

a preamble signal communicating step of communicating a preamble signal with a partner;

a multi-channel data communicating step of communicating multi-channel data with the partner;

a control step of controlling execution of said multi-channel data communicating step in a manner such that a transmission power of each channel is inversely proportional to a number of channels which are used in said multi-channel data communicating step for communicating the multi-channel data when the multi-channel data is communicated after the preamble signal;

a receiving step of receiving the data transmitted through a plurality of channels in said multi-channel data communicating step; and a reception control step of controlling execution of said receiving step in accordance with the number of channels which are used in said multi-channel communicating step, wherein said reception control step includes a detecting step of detecting the number of channels on the basis of respective de-spreading outputs by a plurality of de-spreading code sequences.

16. A multiple communicating method comprising:

a preamble signal communicating step of communicating a preamble signal with a partner;

a multi-channel data communicating step of communicating multi-channel data with the partner;

a control step of controlling execution of said multi-channel data communicating step in a manner such that a transmission power of each channel is inversely proportional to a number of channels which are used in said multi-channel data communicating step for communicating the multi-channel data when the multi-channel data is communicated after the preamble signal;

a receiving step of receiving the data transmitted through a plurality of channels in said multi-channel data communicating step; and a reception control step of controlling execution of said receiving step in accordance with the number of channels which are used in said multi-channel communicating step, wherein said reception control step includes a preamble receiving step of receiving the number of channels included in the preamble signal which is provided for a reception side to synchronize a plurality of code sequences which are used for a code division multiples with a transmission side.

17. A method according to claim 9, wherein said preamble signal communicating step includes communicating the preamble signal including the number of channels.

18. A method according to claim 9, wherein said multi-channel data communicating step includes a spreading step of spreading the multi-channel data by a plurality of spreading code sequences, and adding the multi-channel data spread in said spreading step, and said control step includes controlling the transmission power by the added multi-channel data.

19. An apparatus according to claim 1, wherein said communicating means communicates the preamble signal including the number of the channels.

20. An apparatus according to claim 1, wherein said communicating means includes spreading means for spreading the multi-channel data by a plurality of spreading code sequences, and adding means for adding the spread multi-channel data, and wherein said control means controls the transmission power in accordance with an output from said adding means.

21. A multi-channel data communicating apparatus comprising:

communicating means for communicating a preamble signal and multi-channel data with a partner; and control means for controlling transmission power of the multi-channel data in accordance with a number of channels which are used for communicating the multi-channel data, wherein the number of the channels which are used for communicating the multi-channel data is included in the preamble signal.

22. An apparatus according to claim 21, wherein said control means controls the transmission power so that a transmission power of each channel is inversely proportional to the number of channels.

23. An apparatus according to claim 21, wherein said communication means includes spreading means for spreading the multi-channel data by means of a plurality of spreading code sequences.

24. An apparatus according to claim 23, wherein said communicating means includes adding means for adding the spread multi-channel data.

25. An apparatus according to claim 24, wherein said control means controls the transmission power by an output of said adding means.

26. An apparatus according to claim 21, wherein the preamble signal is used for synchronization between a transmission side and a reception side.

27. A method for controlling multi-channel data communication, comprising steps of:

communicating a preamble signal with a partner;

communicating multi-channel data with the partner; and controlling transmission power of the multichannel data in accordance with a number of channels which are used for communicating the multi-channel data, wherein the number of the channels which are used for communicating the multi-channel data is included in the preamble signal.

28. A method according to claim 27, wherein said control step includes controlling the transmission power so that transmission power of each channel is inversely proportional to the number of channels.

29. A method according to claim 27, wherein said multi-channel data communicating step includes a spreadIng step of spreading the multi-channel data by means of a plurality of spreading code sequences.

30. A method according to claim 29, wherein said communicating step includes an adding step of adding the spread multi-channel data.

31. A method according to claim 30, wherein said control step includes controlling the transmission power by the added multi-channel data.

32. A method according to claim 27, wherein the preamble signal is used for synchronization between a transmission side and a reception side.

33. A multi-channel data communicating apparatus comprising:

receiving means for receiving a preamble signal and multi-channel data from a partner; and control means for controlling said receiving means for receiving the multi-channel data in accordance with channel information, the channel information being included in the preamble signal and corresponding to the number of channels used for communicating multi-channel data, and a transmission power of the multi-channel data being controlled in accordance with the number of the channels used for communicating the multi-channel data.

34. An apparatus according to claim 33, wherein the transmission power is controlled so that transmission power of each channel is inversely proportional to the number of channels.

35. An apparatus according to claim 33, wherein said receiving means de-spreads the multi-channel data in accordance with a plurality of de-spreading code sequences.

36. An apparatus according to claim 33, wherein said receiving means includes synchronizing means for detecting synchronizing timing in accordance with the preamble signal.

37. A met hod for controlling multi-channel data communication, comprising the steps of:

receiving a preamble signal from a partner;

receiving multi-channel data from the partner; and controlling execution of said multi-channel receiving step in accordance with channel information, the channel information being included in the preamble signal and corresponding to the number of channels used for communicating multi-channel data, and transmission power of the multi-channel data being controlled in accordance with the number of the channels used for communicating the multi-channel data.

38. A method according to claim 37, wherein the transmission power is controlled so that transmission power of each channel is inversely proportional to the number of channels.

39. A method according to claim 37, wherein said receiving step includes de-spreading the multi-channel data in accordance with a plurality of de-spreading code sequences.

40. A method according to claim 37, wherein said receiving step includes a synchronizing step of detecting synchronizing timing in accordance with the preamble signal.

41. A multi-channel communicating apparatus comprising:

spreading means for spreading multi-channel data in accordance with a plurality of spreading code sequences;

adding means for adding the spread multi-channel data to be transmitted to a partner;

converting means for converting an output of said adding means into a transmission frequency; and control means for controlling said converting means so that a transmission power is controlled in accordance with the number of channels which are used for communicating the multi-channel data.

42. An apparatus according to claim 41, wherein said control means controls said converting means so that the transmission power is inversely proportional to the number of channels which are used for communicating the multi-channel data.

43. An apparatus according to claim 41, wherein said spreading means spreads a preamble signal and multi-channel data.

44. An apparatus according to claim 43, wherein the preamble signal includes the number of channels which are used for communicating the multi-channel data.

45. A method for controlling multi-channel communication, comprising the steps of:

spreading multi-channel data in accordance with a plurality of spreading code sequences;

adding the spread multi-channel data to be transmitted to a partner;

converting an output of said adding step into a transmission frequency; and controlling execution of said converting step so that transmission power is controlled in accordance with the number of channels which are used for communicating the multi-channel data.

46. A method according to claim 45, wherein said control step includes controlling execution of said converting step so that the transmission power is inversely proportional to the number of channels which are used for communicating the multichannel data.

47. A method according to claim 45, wherein said spreading step includes spreading a preamble signal and multi-channel data.

48. According to claim 47, where in the preamble signal includes the number of channels which are used for communicating the multi-channel data.

* * * * *

UNITED STATES PATENT AND TRADEMARK OFFICE
CERTIFICATE OF CORRECTION

PATENT NO.    : 6,122,295
DATED         : September 19, 2000
INVENTOR(S)   : ICHIRO KATO ET AL.

It is certified that error appears in the above-identified patent and that said Letters Patent is hereby corrected as shown below:

COLUMN 2

Line 18, "here in below" should read --hereinbelow--.

COLUMN 4

Line 34, "envelop" should read --envelope--.

COLUMN 9

Line 65, "compare" should read --compared--.

COLUMN 10

Line 26, "baseband" should read --base-band--.

COLUMN 11

Line 7, "sequence." should read --sequences.--.

COLUMN 15

Line 16, "spreadIng" should read --spreading--; and
    Line 53, "met hod" should read --method--.

UNITED STATES PATENT AND TRADEMARK OFFICE
CERTIFICATE OF CORRECTION

PATENT NO.   : 6,122,295
DATED        : September 19, 2000
INVENTOR(S)  : ICHIRO KATO ET AL.

It is certified that error appears in the above-identified patent and that said Letters Patent is hereby corrected as shown below:

<u>COLUMN 16</u>

Line 54, "multichannel" should read --multi-channel--; and
    Line 58, "where in" should read --wherein--.

Signed and Sealed this

First Day of May, 2001

Attest:

NICHOLAS P. GODICI

Attesting Officer    Acting Director of the United States Patent and Trademark Office